United States Patent
Eckert et al.

(10) Patent No.: US 12,324,520 B2
(45) Date of Patent: Jun. 10, 2025

(54) METHOD FOR PRODUCING A COVER FOR A FURNITURE PANEL

(71) Applicant: Bulthaup GMBH & CO. KG, Bodenkirchen (DE)

(72) Inventors: Marc Oliver Eckert, Bodenkirchen (DE); Andreas Ringwald, Landshut (DE); Gerhard Limmer, Frontenhausen (DE)

(73) Assignee: Bulthaup GMBH & CO. KG, Bodenkirchen (DE)

( * ) Notice: Subject to any disclaimer, the term of this patent is extended or adjusted under 35 U.S.C. 154(b) by 703 days.

(21) Appl. No.: 17/042,436

(22) PCT Filed: Mar. 26, 2019

(86) PCT No.: PCT/EP2019/057615
§ 371 (c)(1),
(2) Date: Mar. 18, 2021

(87) PCT Pub. No.: WO2019/185644
PCT Pub. Date: Oct. 3, 2019

(65) Prior Publication Data
US 2021/0204694 A1    Jul. 8, 2021

(30) Foreign Application Priority Data
Mar. 28, 2018   (DE) ..................... 10 2018 107 440.9

(51) Int. Cl.
*A47B 96/20*     (2006.01)
*B32B 3/02*      (2006.01)
(Continued)

(52) U.S. Cl.
CPC .......... *A47B 96/206* (2013.01); *A47B 96/201* (2013.01); *B32B 3/02* (2013.01);
(Continued)

(58) Field of Classification Search
CPC ........ A47B 96/206; A47B 96/202; B23B 3/04
See application file for complete search history.

(56) References Cited

U.S. PATENT DOCUMENTS

| 3,856,611 A | * | 12/1974 | Markley | .................. B32B 3/04 |
| | | | | 428/116 |
| 2004/0187542 A1* | | 9/2004 | Golovashchenko | ..... B21D 5/04 |
| | | | | 72/306 |

(Continued)

FOREIGN PATENT DOCUMENTS

| DE | 9211033 U1 | 1/1993 |
| DE | 19840957 A1 | 3/2000 |
| GB | 1595032 A | 8/1981 |

OTHER PUBLICATIONS

Thomas, Laser Cutting Steel and Aluminum, screen shot taken on Jun. 18, 2017, available at https://www.thomasnet.com/articles/custom-manufacturing-fabricating/laser-cutting-steel-aluminum/ (Year: 2017).*

(Continued)

*Primary Examiner* — Kyle A Cook
(74) *Attorney, Agent, or Firm* — MARSHALL, GERSTEIN & BORUN LLP

(57) ABSTRACT

The present invention relates to a method for producing a cover for a furniture panel, in particular for a furniture front, wherein the method comprises the following steps:
 a) laminating a carrier material with a covering,
 b) removing the corners of the covering,
 c) draping the protruding edges of the covering over the carrier material,
 d) bending the edge of the carrier material,
 e) draping the edges of the covering inwards, i.e. towards the carrier material, with step e) preferably taking place at the same time as step d).

15 Claims, 2 Drawing Sheets

(51) Int. Cl.
    *B32B 3/04*     (2006.01)
    *B32B 15/04*     (2006.01)
    *B32B 38/00*     (2006.01)
    *B32B 38/04*     (2006.01)

(52) U.S. Cl.
    CPC ............... B32B 3/04 (2013.01); B32B 15/04 (2013.01); B32B 38/0004 (2013.01); B32B 38/04 (2013.01); *B32B 2038/042* (2013.01); *B32B 2479/00* (2013.01)

(56) References Cited

U.S. PATENT DOCUMENTS

| | | | | |
|---|---|---|---|---|
| 2008/0066410 | A1* | 3/2008 | Dalle Mese | B29C 66/1122 52/309.1 |
| 2015/0037534 | A1* | 2/2015 | Schott | B32B 3/04 72/306 |
| 2016/0121522 | A1* | 5/2016 | Mazur | B32B 5/20 428/157 |

OTHER PUBLICATIONS

International Application No. PCT/EP2019/057615, International Search Report, mailed Jul. 3, 2019.
German Patent Application No. 10 2018 107 440.9, Search Report, dated Jul. 1, 2020.

* cited by examiner

METHOD FOR PRODUCING A COVER FOR A FURNITURE PANEL

CROSS-REFERENCE TO RELATED APPLICATION

This application is a 35 U.S.C. § 371 National Stage of International Patent Application No. PCT/EP2019/057615, filed Mar. 26, 2019, which itself claims the benefit of and priority to German Application No. 10 2018 107 440.9, filed on Mar. 28, 2018, the content of each of which is incorporated by reference herein in its entirety and for all purposes.

The present invention relates to a method for producing a cover for a furniture panel.

It is for example known from the prior art to provide a furniture front, for example of a drawer, with a cover, such as a decoration comprising a decorative layer. In this case, a carrier panel made of composite wood may for example be provided with a plastics coating, which gives the furniture front the final visual appearance.

A drawback of this kind of furniture front is that the decoration cannot be changed, or can only be changed with great effort, and moreover, during assembly, great care is needed to ensure that the decoration is not damaged.

The problem addressed by the present invention is to provide a method in which the visual appearance of the furniture panel can be easily changed and also the risk of the cover being damaged during assembly can be eliminated.

This problem is solved by a method having the features of claim 1.

According to said claim, it is provided that the method comprises the following steps:
 a) laminating a carrier material with a covering,
 b) removing the corners of the covering,
 c) draping the protruding edges of the covering over the carrier material,
 d) bending the edge of the carrier material,
 e) draping the edges of the covering inwards, i.e. towards the carrier material.

The carrier material may consist of metal and be cut, preferably lasered, from a panel. Other materials, such as wood, also come into consideration for the carrier material. The corners of the covering may be removed by punching, for example.

Preferably, the edges of the carrier material are bent in step d) and the draping takes place in step e) at the same time.

One side of the carrier material may be laminated over its entire surface, a protrusion of the covering remaining, which is draped according to step c).

It is conceivable for the carrier material to have a polygonal, preferably rectangular, shape and to comprise protruding edges that are bent in step d).

It should be noted at this point that the term "panel" should not be interpreted in a restrictive manner such that it has to relate to a planar, flat component. Curved materials or furniture panels of any shape and thickness are covered by the invention and the term "panel".

Furthermore, it may be provided that the edge bending in step d) is at right angles, such that a box-shaped component is produced of which one side is open.

A simple and durable fastening option is provided if the covering is bonded to the carrier material at least in regions or over the entire surface.

The covering may comprise or consist of leather and/or a textile material and/or plastics material and/or a film and/or paper, in part or completely.

Preferably, the covering is produced without seams.

In another method step, the cover is fitted onto a carrier after being produced.

The present invention further relates to the use of a cover according to claim 10, provided with a carrier, as a furniture panel, in particular as a furniture front or door.

It should be noted at this point that the terms "a", "an" and "one" do not necessarily refer to exactly one of the elements, even though this constitutes a possible configuration, but instead they can also denote a plurality of said elements. Likewise, the use of the plural also includes the presence of the element in question in the singular and, vice versa, the singular also includes a plurality of the elements in question.

Other details and advantages of the invention are explained in greater detail with reference to an embodiment shown in the drawings, in which.

Figure 1:
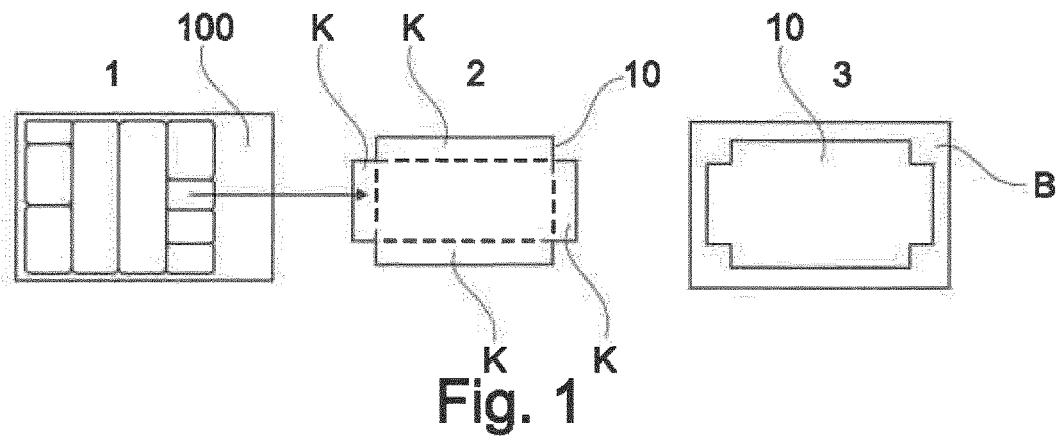
FIG. 1 is a schematic view of the working steps for producing the cover.

FIG. 1 shows, in step 1, a sheet-metal panel 100, from which individual sheet-metal blanks 10 are cut by lasering, for example.

The steps are each denoted by numbers above the figures.

A sheet-metal blank 10 of this kind is shown in step 2. It has a rectangular shape (dashed lines), on each of the sides of which an edge region K protrudes. The sheet-metal blank 10 forms the carrier panel 10.

In step 3, the carrier material 10 is laminated on one entire side with textile or leather or another covering B.

In step 4, a punch S is then positioned in the corner regions of the covering and one corner of the covering is punched out, as shown in step 5.

The protruding edges of the covering B are then draped over the carrier material 10, as is clear from step 5 (see arrows) and the edges K of the carrier material 10 are bent in succession (1, 2, etc.) or at the same time, as shown in step 6. These edges K are preferably perpendicular to the base surface of the carrier material, i.e. perpendicular to the plane of the paper.

When bending the edges, the covering is draped inwards at the corners (see arrow), i.e. towards the carrier material (step 7). The outer face of the cover, which is at the bottom in steps 1 to 7, is then completely provided with the covering.

If the cover is turned over starting from the position according to step 7, the cover 200 according to step 8 is obtained, i.e. a box-shaped body having an open side, which is arranged on the bottom in step 8.

Figure 2:
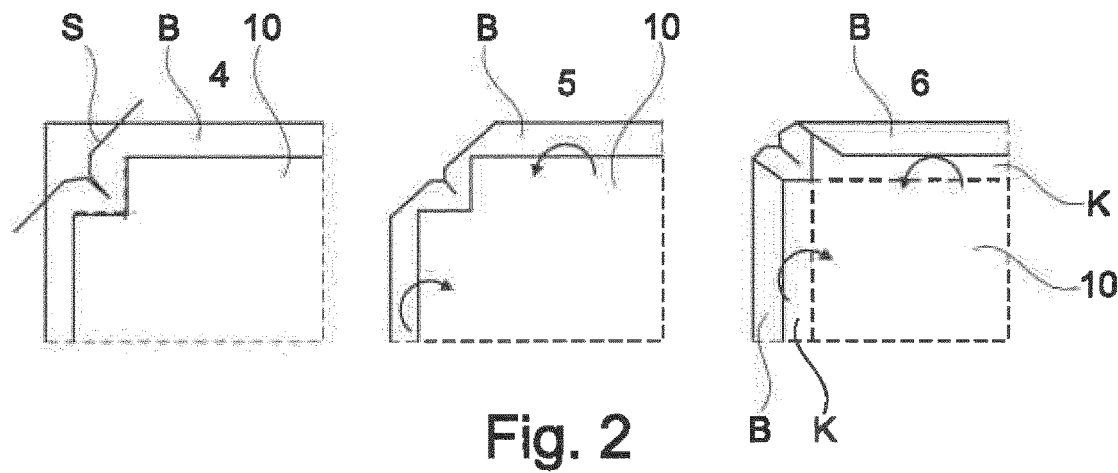
FIG. 2 is a perspective view of the corner region of a carrier panel.

FIG. 2 shows the carrier panel T with a chamfer and a step-shaped projection S.

Figure 3:
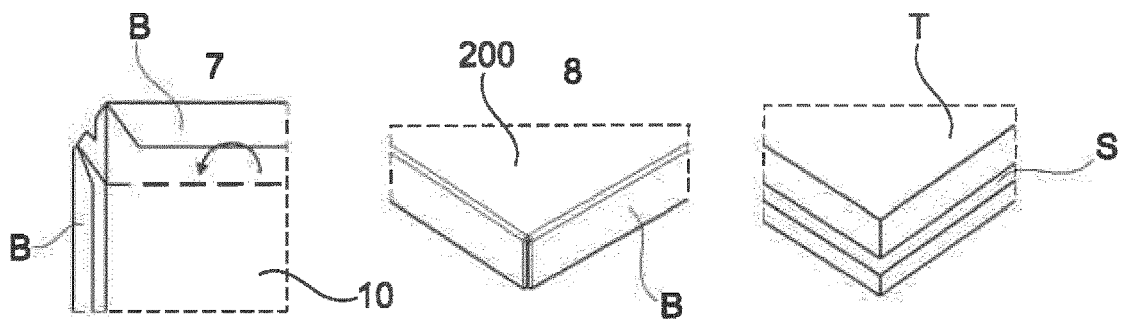
FIG. 3 shows perspective views of the corner region of a carrier panel comprising holes without a hinge, with a hinge, and with a cover before it is fitted thereto.
Figure 3:
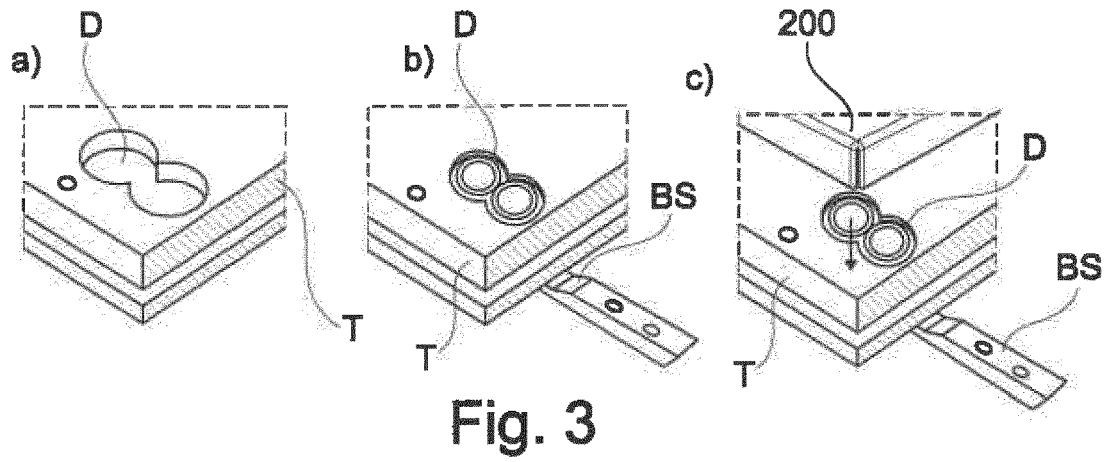

FIG. 3 shows the holes D in the carrier panel T without fittings (*a*), with hinge brackets received therein (*b*) on which the hinge BS is positioned, and shortly before the cover 200 is fitted, as shown in FIG. 3 *c*).

Figure 4:
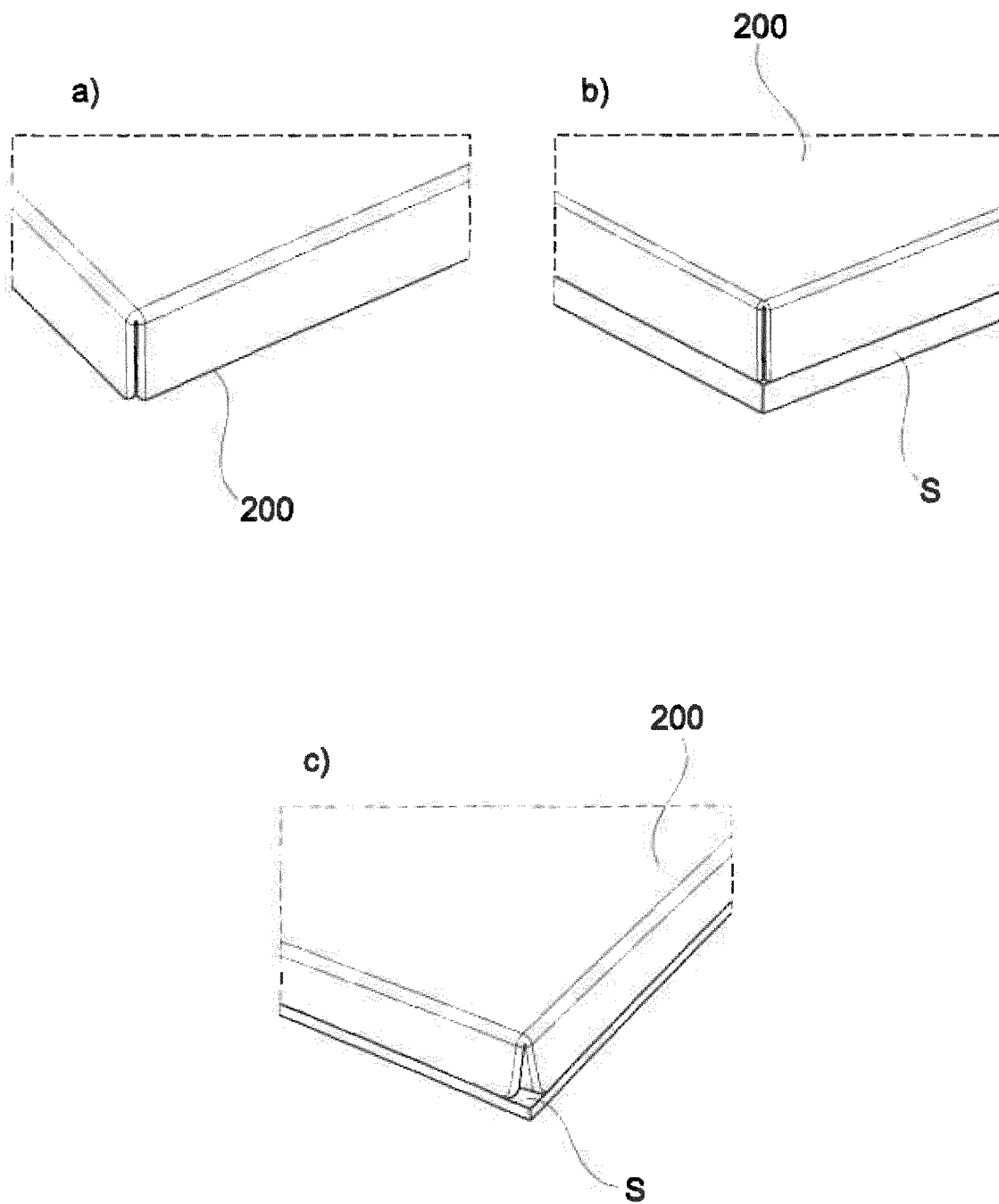
FIG. 4 shows perspective views of the corner region of a cover and a furniture panel with different materials for the cover.

FIG. 4 *a*) shows a cover 200 having a textile outer face without a carrier panel. FIG. 4 *b*) shows the cover 200 when fitted to the carrier panel T, with the cover comprising textile on its visible outer face.

FIG. 4 *c*) shows the arrangement according to FIG. 4 *b*) comprising a cover, the outer face of which consists of natural leather.

In a preferred configuration, the present invention has one or more of the following advantages:
1. Single-sided leather/textile lamination possible without offset of the components owing to floating mounting of the cover on the carrier panel,
2. Industrial process of bonding the front faces possible,
3. Textile seam appearance without seams,
4. Modular system: free combination of the materials for the carrier and cover,
5. Variation is only produced right at the end of the production process,
6. Dual-shell structure, resulting in visual "lightness",
7. Retroactive replacement of the covers possible,
8. All of the technology (hinges, touch fittings, soft-close fittings, etc.) is on the back, i.e. on the side of the carrier panel facing away from the cover, and is made of known material,
9. Cover is only attached right at the end of the production process, meaning that the risk of damage/soiling is reduced,
In-house manufacturing and external procurement of the covers conceivable,
11. No open edges on the covering, e.g. on the leather or textile,
12. Carrier can be completely sealed, and therefore protection against moisture can also be provided,
13. A wide range of materials can be processed, such as leather, textiles, paper, films, etc.

The invention claimed is:

1. A method for producing a cover for a furniture panel, the cover comprising a box-shape with one side open, wherein the method comprises the following steps:
   a) laminating a carrier material with a covering,
   b) removing corners of the covering,
   c) draping protruding edges of the covering over the carrier material,
   d) bending the edge of the carrier material, and
   e) draping the edges of the covering inwards,
   wherein the carrier material comprises metal and is cut, by being lasered from a panel, and
   wherein the edge bending in step d) is at right angles, such that the cover produced at the end of the method is the box-shape with one side open.

2. The method according to claim 1, wherein the corners of the covering are removed by punching.

3. The method according to claim 1, wherein one side of the carrier material is laminated over its entire surface and, in the process, a protrusion of the covering remains, which is draped according to step c).

4. The method according to claim 1, wherein the carrier material has a polygonal shape and comprises the edge that is bent in step d).

5. The method according to claim 1, wherein the covering is bonded to the carrier material at least in regions.

6. The method according to claim 1, wherein the covering comprises leather and/or a textile material and/or plastics material and/or a film and/or paper, in part or completely.

7. The method according to claim 1, wherein the covering is produced without seams.

8. The method according to claim 1, wherein step e) takes place at the same time as step d).

9. A method, comprising:
   producing a cover according to the method of claim 1; and
   fitting the cover onto a carrier and fixing thereto by a force fit and/or form fit.

10. The method according to claim 9, further comprising using the cover and the carrier as at least one of a furniture panel, a furniture front, or door.

11. The method according to claim 10, wherein one side of the carrier material is laminated over its entire surface and, in the process, a protrusion of the covering remains, which is draped according to step c).

12. The method according to claim 11, wherein the carrier material has a polygonal shape and comprises the edge that is bent in step d).

13. The method according to claim 12, wherein the covering is bonded to the carrier material at least in regions.

14. The method according to claim 13, wherein the covering comprises leather and/or a textile material and/or plastics material and/or a film and/or paper, in part or completely.

15. The method according to claim 14, wherein the covering is produced without seams.

* * * * *